United States Patent
Attanasio et al.

(10) Patent No.: US 8,400,927 B2
(45) Date of Patent: Mar. 19, 2013

(54) SERVICE BASED LAWFUL INTERCEPTION

(75) Inventors: Francesco Attanasio, Nocera Superiore (IT); Amedeo Imbimbo, Caivano (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 373 days.

(21) Appl. No.: 12/375,116

(22) PCT Filed: Jul. 26, 2006

(86) PCT No.: PCT/SE2006/000914
§ 371 (c)(1),
(2), (4) Date: Jan. 26, 2009

(87) PCT Pub. No.: WO2008/013482
PCT Pub. Date: Jan. 31, 2008

(65) Prior Publication Data
US 2009/0207751 A1    Aug. 20, 2009

(51) Int. Cl.
*G01R 31/08* (2006.01)
*H04L 12/28* (2006.01)
*G06F 15/173* (2006.01)
*G06F 15/16* (2006.01)

(52) U.S. Cl. .................................... 370/241; 370/252
(58) Field of Classification Search .......... None
See application file for complete search history.

(56) References Cited

U.S. PATENT DOCUMENTS

| | | | |
|---|---|---|---|
| 6,711,689 B2 * | 3/2004 | Lumme et al. | 726/22 |
| 7,310,331 B2 * | 12/2007 | Sjoblom | 370/353 |
| 7,447,909 B2 * | 11/2008 | Reith | 713/183 |
| 2005/0175156 A1 * | 8/2005 | Afshar et al. | 379/35 |

FOREIGN PATENT DOCUMENTS

| WO | WO 02/093838 A1 | 11/2002 |
|---|---|---|
| WO | WO 2004/010649 A1 | 1/2004 |

OTHER PUBLICATIONS

3GPP , Universal Mobile Telecommunications System (UMTS); 3G Security; Lawful Interception Architecture and Functions (3GPP TS 33.107 v 6.5.0 Release 6) ETSI TS 133.107. 3GPP ETSI Standards, Sophia Antipolis, France. Jun. 1, 2005).
3GPP , Universal Mobile Telecommunications System (UMTS); 3G Security; Handover Interface for Lawful Interception (LI) (3GPP TS 33.108 v 6.9.0 Release 6) ETSI TS 133.108. 3GPP ETSI Standards, Sophia Antipolis, France. Jun. 1, 2005).

* cited by examiner

*Primary Examiner* — Kevin C Harper
*Assistant Examiner* — Samina Choudhry

(57) ABSTRACT

The present invention relates to methods and arrangements in a telecommunication system to monitor information related to specified services in a service unaware node. The node handles Content of Communication associated with services. The system comprises a Delivery Function to which Content of Communication related to a target is received from the node. The method comprises the following steps: Receiving from a requesting entity to the Delivery Function a request to delimit the received Content of Communication according to not desired services. Parsing the received Content of Communication according to not desired services by a Packet Inspection Feature associated with the Delivery Function. Forwarding Control Information related to the not desired services to the requesting entity.

6 Claims, 5 Drawing Sheets

SERVICE BASED LAWFUL INTERCEPTION

FIELD OF INVENTION

The present invention relates to monitoring of information related to specified services when monitoring takes place in a service unaware node.

BACKGROUND

A service aware node is a telecommunication node that provides or is used for specific services, like the WAP gateway, E-mail gateway, that is able to discriminate the service associated with Content of Communication. A service unaware node means a telecommunication node that is independent on the transported applications/services. To filter Content of Communication related to specific services, a Service Aware Support Node SASN could be used. In order to provide service awareness by traffic inspection, the SASN captures IP traffic packets to analyze them. The SASN is located in any point of an IP network in the path of the traffic which has to be monitored. IP Gateway deployment is used, having the advantage of being multi-access and several access networks can be supported from the same platform, for example, CSD, GPRS and WiFi. It is also useful in multi-vendor environments, where integrated functionality in Gateway GPRS Support Nodes GGSNs may not be an option. The SASN has an active role, and can apply control policies selectively blocking certain services. The SASN can also disconnect the underlying Packet Data Protocol context through Remote Authentication Dial-In User Service RADIUS. The user traffic is captured by defining the SASN as default gateway between two intermediate elements on the path of the user data traffic. The SASN sniffs RADIUS traffic. RADIUS traffic is captured transparently using the same IP Gateway mechanism applied to the user traffic. A key feature of the SASN is deep packet inspection capability, because this function provides the service awareness on which so many other features are based (for example, service-differentiated charging or service access control). The Deep Packet Inspection module in the SASN parses incoming user traffic, delimits the flows according to the protocol being used, and extracts several parameters that are used by a traffic classification engine, according to some configurable classification rules.

Monitoring of Interception Related Information IRI and Content of Communication CC for a target is part of prior art. Content of Communication is defined as information such as speech and data and Intercept Related Information is defined as signaling information related to target subscribers. The different parts in an Intercept Mediation and Deliver Unit IMDU used for interception are disclosed in current Lawful Interception standards (see 3GPP TS 33.108 and 3GPP TS 33.107—Release 6 and Release 7). A Law Enforcement Monitoring Facility LEMF is connected to three Mediation Functions MF, MF2, MF3 respectively for ADMF, DF2, DF3 i.e. an Administration Function ADMF and two Delivery Functions DF2 and DF3. There is one Administration Function in the network. Together with the delivery functions it is used to hide from 3G ICEs (Intercepting Control Elements) that there might be multiple activations by different Law Enforcement Agencies on the same target. The Administration Function and the Delivery Functions are each one connected to the LEMF via standardized handover interfaces HI1-HI3, and connected to a telecommunication system via the interfaces X1-X3. The ADMF is connected via the interfaces HI1/X1 while DF2 is connected via HI2/X2 and DF3 is connected via HI3/X3. The messages sent from LEMF to ADMF, via HI1 and from the ADMF to the network via the X1 interface, comprise identities of a target that is to be monitored, The Delivery Function DF2 receives Intercept Related Information IRI from the network via the X2 interface, and DF2 is used to distribute the IRI to relevant Law Enforcement Agencies via the HI2 interface. The Delivery Function DF3 receives Content of Communication CC, i.e. speech and data. In Circuit Switching, DF3 is responsible for call control signaling and bearer transport for an intercepted product. Intercept Related Information IRI, received by DF2 is triggered by Events that in Circuit Switching domain are either call related or non-call related. In Packet Switching domain the events are session related or session unrelated.

In the current Lawful Interception LI standard solution, when intercepting in some nodes, like the GGSN nodes, the Broadband Remote Access Server BRAS nodes, etc. . . . the intercepted Content of Communication carries different types of services/applications (WAP, HTTP, RTP, . . . ). Some lawful authorities could be interested to activate the interception of Content of Communication only for some specific services. One of the reasons to filter some specific service related packets could be related to limit on the link capacity towards the LI agencies that could not be able to convey high band with service specific packets or related to limits on the processing capacity of the LI agencies to elaborate such Contents of Communication. Another reason could be simply because the lawful authority doesn't require intercepting some kind of services. Since a service unaware node, like GGSN and BRAS, is a telecommunication node that is independent on the transported applications/services, the node is not able to discriminate between the services.

In the international patent application WO 00/42742 is disclosed an intercepting function comprising a sniffing and filtering function that facilitates reading data packets, analyzing the header of the packets as to whether the data packets should be intercepted or not.

Also information of discarded services may be important to agencies for awareness of which services that have been discarded. For example Lawful authorities not receiving Content of Communication, e.g. related to HTTP, may need to retrieve the actual contents that were missed. This information could be useful for the agencies for lawful investigation purposes e.g. to keep track of all actual discarded services.

SUMMARY OF INVENTION

The present invention relates to problems how to release bandwidth consumption by discarding undesired Content of Communication related to specified services when intercepting in a service unaware node.

A further problem to be solved relates to communicating to agencies also information related to the services associated to the discarded Content of Communication.

A purpose with the invention is to customize the amount of downloaded information to agencies by offering a flexible interception solution with optimal link capacity usage. Thus, the object of the invention is to customize the amount of downloaded information and deliver needed information only. This object and others are achieved by methods, arrangements, systems and articles of manufacture.

The problems are solved by parsing Content of Communication received for interception and only deliver desired information to a requesting entity.

In more detail the problems are solved inter alia by methods and arrangements to monitor information related to specified services in a service unaware node, which node handles Content of Communication associated to services, which system comprises a Delivery Function that receives target related Content of Communication from the node. The method comprises the following steps:

- A request to delimit the received Content of Communication according to not desired services is received from a requesting entity to the Delivery Function.
- A Packet Inspection Feature associated with the Delivery Function parses the received Content of Communication according to not desired services.
- Control Information related to not desired services is forwarded to the requesting entity.

In another embodiment the problems are solved inter alia by methods and arrangements to monitor information related to specified services in a service unaware node, which node handles Content of Communication associated to services, which system comprises a Delivery Function that receives target related Content of Communication from the node. The method comprises the following steps:

- A request to delimit the received Content of Communication according to desired services is received from a requesting entity to the Delivery Function.
- A Packet Inspection Feature associated with the Delivery Function parses the received Content of Communication according to desired services.
- Content of Communication associated to desired services is forwarded from the Delivery Function to the requesting entity.

Another embodiment comprises a combination of the above embodiments where Content of Communication is delimited according to both desired and not desired services.

An advantage with the invention for agencies is that when requesting interception of Content of Communication in service unaware nodes, the agency can order to receive only packets related to some specific services, solving the potential problems related to link capacity or processing capabilities.

Another advantage for the agencies is that even in case of not requested services for CC interception, the agencies will receive the indication on the HI2 interface about the invoked services and additional info that could be useful for the agencies for lawful investigation purposes. For example, in case of HTTP, it will receive the following info: URL, Content-type, ... or
RTP: Payload Type (0: PCM mu-law, ... 26: Motion JPEG; ... 33: MPEG2 video ...) ...,
that could be used for keeping track of all actual discarded services, for further processing. Even better, the lawful authority not receiving CC e.g. related to HTTP, can use the URL (provided via HI2) to retrieve the actual contents missed over HI3.

An advantage for operators is that costs for the links towards the agencies in the interception domain can be lowered.

Another advantage for the operators is that a more flexible LI solution can be offered to the LI agencies in case of interception in the nodes (like GGSN, SGSN, BRAS) that are used just to intercept packets that could be used to convey any kind of service, that possibly are not interesting for the LI agency.

The invention will now be described more in detail with the aid of preferred embodiments in connection with the enclosed drawings.

DETAILED DESCRIPTION OF THE INVENTION

Figure 1:
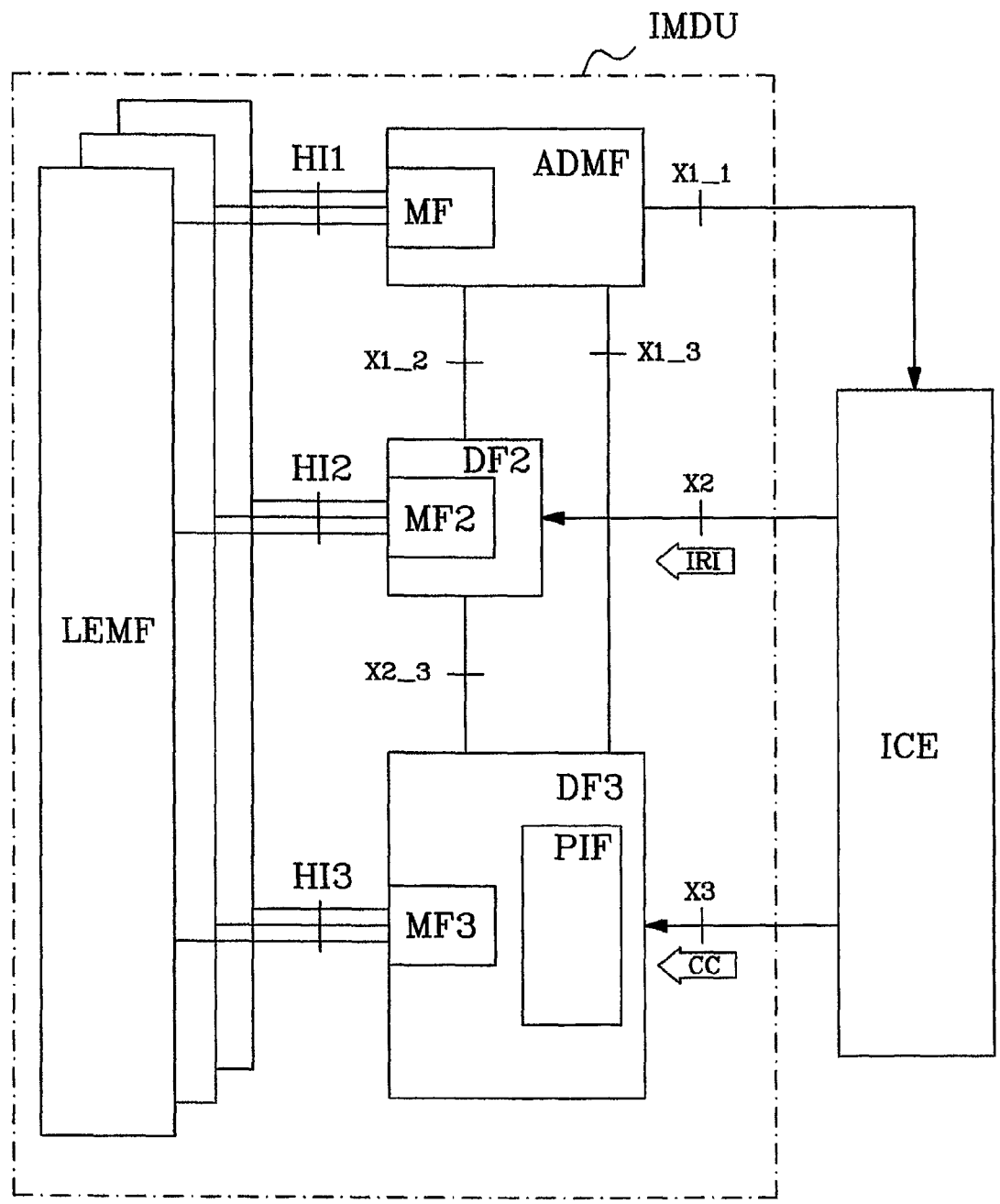
FIG. 1 discloses a block schematic illustration of an Intercept Unit attached to a service unaware Intercepting Control Element.

FIG. 1 discloses a block schematic illustration of an Intercept Mediation and Deliver Unit IMDU attached to a service unaware Intercepting Control Element ICE. Parts of the IMDU belong to the prior art and have already been explained in the background part of this application. Subscriber identity to be monitored i.e. target identity is sent from the ADMF to the ICE via an interface X1_1. Content of Communication CC such as speech and data is sent from ICE to DF3 via an interface X3. Intercept Related Information IRI such as signaling information related to target subscribers is sent from ICE to DF2 via an interface X2. The Delivery Function DF3 comprises a Packet Inspection Feature PIF in which Content of Communication can be analysed. Specification of information that is to be delimited from the Content of Communication is sent from the ADMF to DF3 via an interface X1_3. An interface X2_3 is according to the invention located between DF2 and DF3. Control information CIA related to delimited information is sent from DF3 to DF2 via an interface X2_3.

The Intercepting Control Element ICE is a so called service unaware node. While a service aware node means a telecommunication node that provides or is used for specific services, like a WAP gateway, E-mail gateway, that is able to discriminate services associated with the Content of Communication being intercepted, a service unaware node is a telecommunication node that is independent of the transported application/services, like the Gateway GPRS Support Node GGSN or the Broadband Remote Access Server BRAS. Content of Communication CC packets associated with different services pass through the Intercepting Control Element ICE.

Different embodiments of the invention will now be explained more in detail. Content of Communication CC, related to an intercepted target is received to an Intercept Mediation and Deliver Unit IMDU from an Intercepting Control Element ICE. Received CC packets are associated with different services and in the embodiments below, both data packets associated with not desired services and/or data packets associated with desired services are delimited from the received CC.

Figure 2:
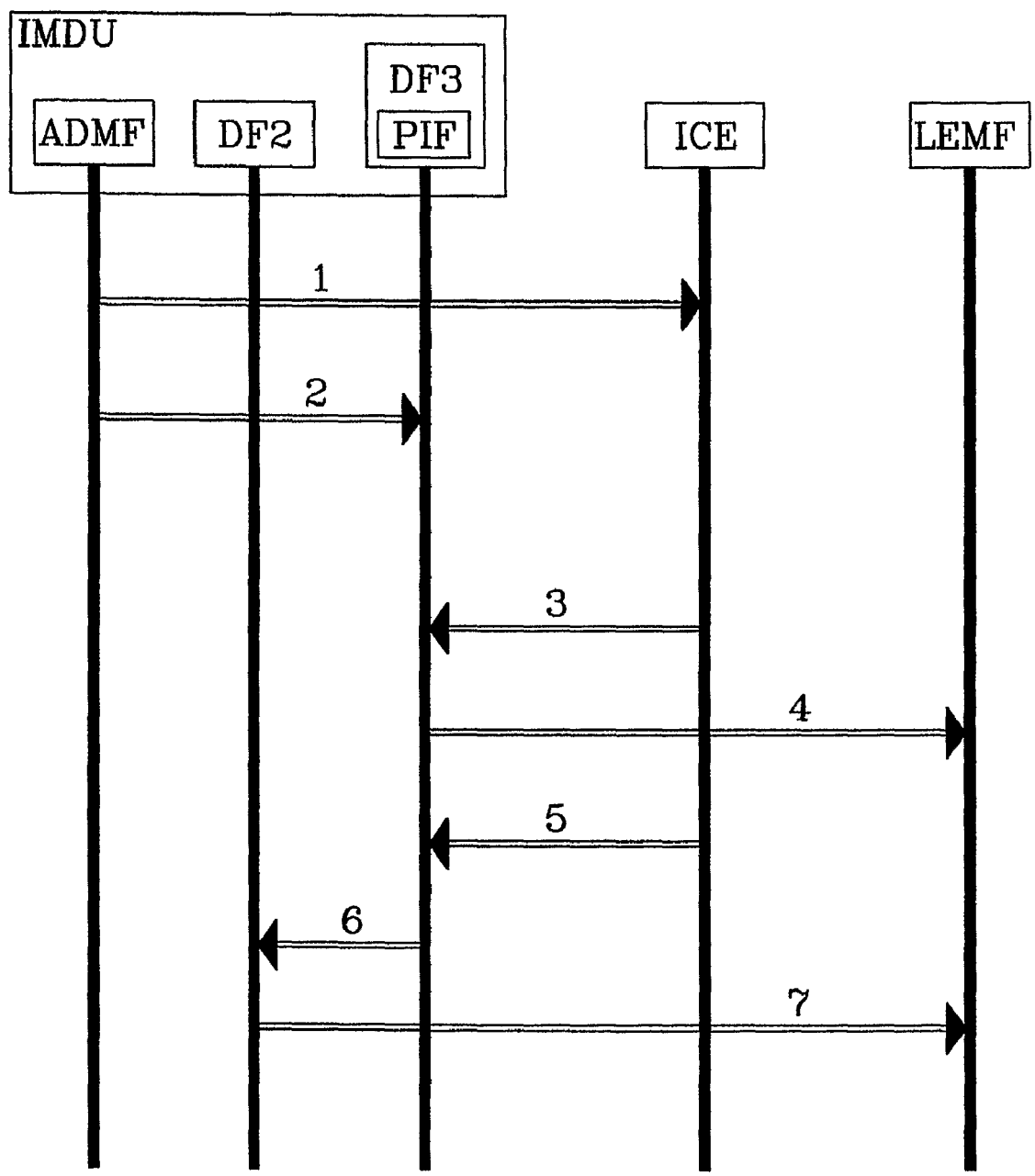
FIG. 2 discloses a signal sequence diagram representing a method according to the invention wherein monitored information is delimited to desired and not desired services.

A first embodiment of the invention will now be explained together with FIG. 2. The different entities IMDU, ADMF, DF2, DF3, PIF, ICE and LEMF in FIG. 2 correspond to the ones disclosed in FIG. 1. In this example only CC packets associated with Multimedia Messaging Service MMS are of interest for an agency to monitor, while packets associated with RTP Streaming are to be discarded. However, even if the actual CC is discarded also knowledge of utilization by a target of CC associated with RTP Streaming is of interest for the agency. The specified target and interception criteria are reported to the ADMF in the IMDU. Generally, this stems from a warrant or other authorization from a government or other authorized institution. A method according to the first embodiment of the invention comprises the following steps:

Lawful interception related to the target is activated by an interception request 1 comprising target identity IMSI, sent from the Administration Function ADMF to the Intercepting Control Element ICE.

A specification of which Content of Communication CC that is of interest for the agency to monitor, i.e. in this example specification of CC associated with Multimedia Messaging Service MMS, is sent 2 from the ADMF to the Delivery Function DF3 via the interface X1_3. MMS specification is stored in DF3 as a service associated to CC that is of interest for the agency to monitor. In the same message is sent 2 a specification of which Content of Communication that is of no interest for the agency to monitor and is to be discarded, i.e. in this example CC associated with RTP streaming. Also this specification is stored in DF3. RTP streaming specification is hereby stored in DF3 as a service associated to CC that is of no interest for the agency to monitor.

Digital photos are sent from the target. The target hereby starts to make use of CC associated with Multimedia Messaging Service MMS.

Target related packets comprising Content of Communication associated with Multimedia Messaging Service are sent 3 from the ICE to DF3 via the interface X3.

Received CC packets associated with MMS are forwarded to the Packet Inspection Feature PIF that in this example is located within the Delivery Function DF3. To be noted is that the PIF as well might be located outside the DF3.

The Packet Inspection Feature PIF parses the received packets and detects that multimedia messaging service MMS is associated with the parsed CC.

The delivery Function DF3 compares the result of the parsing with stored services and finds a match between services MMS in parsed packets and stored services associated to CC that is of interest for the agency to monitor.

The CC associated with Multimedia Messaging Service MMS is forwarded 4 from DF3 to LEMF via a Handover Interface HI3.

A continuation of the first embodiment comprises the following further steps:

A video stream order is sent to from the target to a video server and when the ordered video stream is received from the server to the target, the target starts to utilize CC associated with RTP streaming.

CC packets associated with RTP streaming are forwarded 5 from the ICE to the Packet Inspection Feature PIF.

The Packet Inspection Feature PIF parses and detects RTP streaming as a service associated to CC that is of no interest for the agency to monitor and instead is to be discarded.

Control Information CIA related to the RTP streaming associated with the discarded CC is sent 6 from the Delivery Function DF3 to the Delivery Function DF2 via the interface X2_3. A notification is hereby sent, that comprises information about the services which packets have been discarded and with additional information for each service for example: RTSPFlowID, Payload Type. To be noted is that each agent could require different services for Content of Communication. The information about the services whose packets have been discarded is preferably not notified for each packet, but just once.

Intercept Related Information IRI is formatted in DF2 as a new record type, namely "Not requested service specific CC interception". The record comprises additional info about which packets have been discarded and additional information for the service.

The Control Information CIA related to the RTP streaming is forwarded 7 as formatted Intercept Related Information IRI with additional information, from the Delivery Function DF2 to the LEMF via the Handover Interface HI2.

Figure 3:
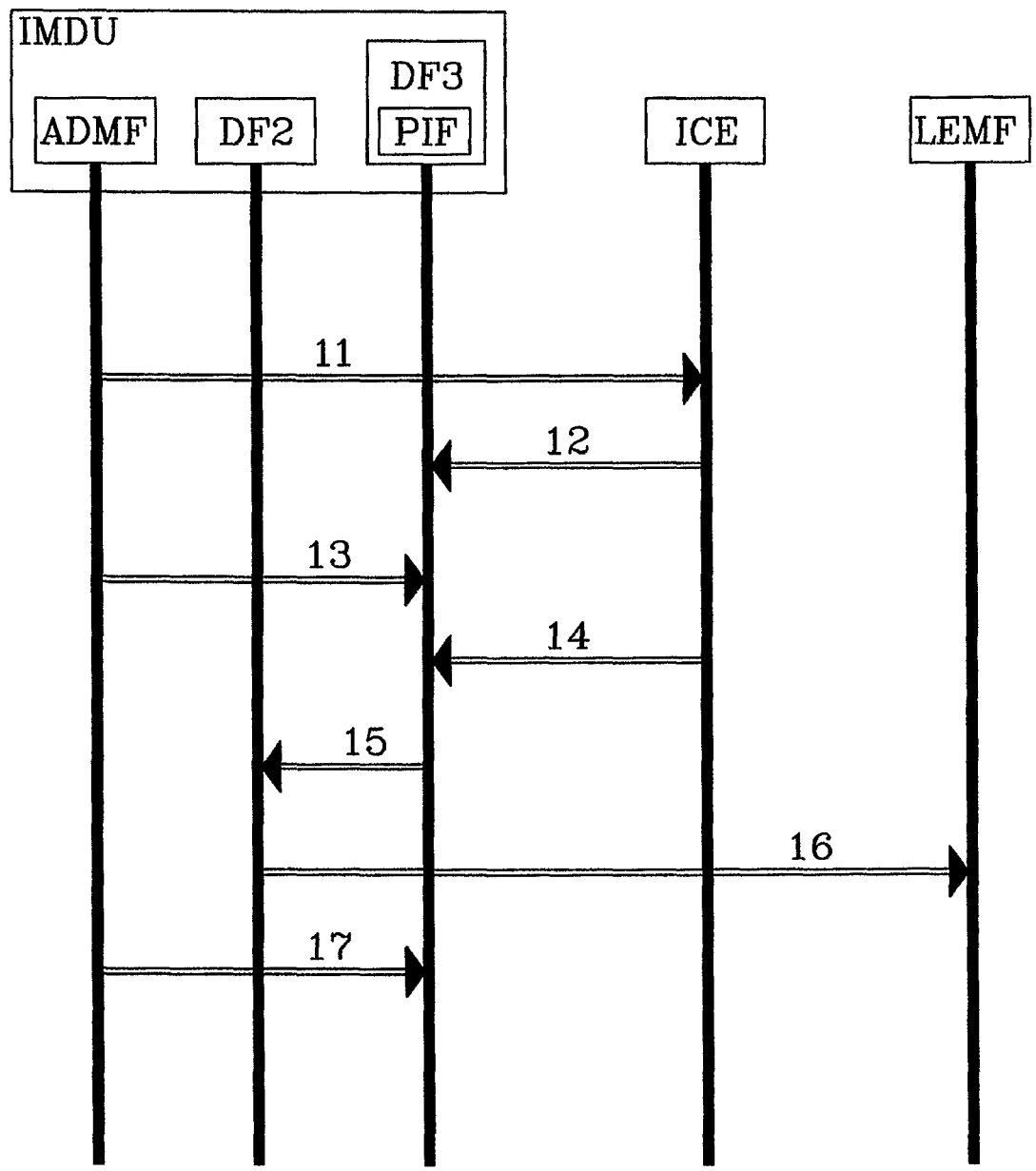
FIG. 3 discloses a signal sequence diagram representing a method according to the invention wherein monitored information is delimited to desired or not desired services.

A second embodiment of the invention will now be explained together with FIG. 3. In this example target related CC packets associated with HTTP Web browsing is to be discarded. No Content of Communication is specified as desired until at the end of the example. A method according to the second embodiment of the invention comprises the following steps:

Lawful interception related to the target is activated by an interception request 11 comprising target identity IMSI sent from the Administration Function ADMF to the Intercepting Control Element ICE.

The target makes use of CC related to FTP downloads and target related packets comprising Content of Communication associated with FTP downloads are sent 12 from the ICE to DF3 via the interface X3.

Received CC packets associated with FTP are forwarded to the Packet Inspection Feature PIF in DF3 where the packets are parsed. The delivery Function DF3 compares the result of the parsing with stored services but finds no match between the services FTP in parsed packets and stored services associated to packets and defined as desired (or undesired) packets. The CC packets will not be forwarded from DF3 to LEMF and no additional control information CIA will be delivered to LEMF.

A specification of CC, i.e. in this example CC associated with HTTP Web browsing, that is of no interest for the agency to monitor and is to be discarded, is sent 13 from the ADMF to the Delivery Function DF3 via the interface X1_3. The specification is stored in DF3. HTTP Web browsing is hereby stored in DF3 as a service associated to CC that is of no interest for the agency to monitor.

The target starts to receive CC associated with HTTP Web Browsing.

CC packets related to the target and associated with HTTP Web browsing are sent 14 from the ICE to DF3 via the interface X3.

The received CC packets associated with HTTP Web browsing are forwarded to the Packet Inspection Feature PIF.

The Packet Inspection Feature PIF parses the packets and detects HTTP Web browsing as a service associated to CC that is of no interest for the agency to monitor and instead is to be discarded.

Control Information CIA related to the HTTP Web browsing is sent 15 from the Delivery Function DF3 to the Delivery Function DF2 via the interface X2_3. A notification is hereby sent with information about the services which packets have been discarded and with additional information for each service for example: HTTP: URL, FlowID, Host, Version, Content-type, Transfer-Encoding.

The Control Information CIA related to the HTTP Web browsing is forwarded 16 from the Delivery Function DF2 to the LEMF via the Handover Interface HI2.

A continuation of the first embodiment comprises the following further steps:

A specification of Content of Communication that is of interest for the agency to monitor, in this example CC associated to FTP downloads, is sent 17 from the ADMF to the Delivery Function DF3 via the interface X1_3. FTP is stored in DF3 as a service associated to CC that is of interest for the agency to monitor.

Potential CC associated to FTP downloads received from ICE to DF3 is from now, after parsing in PIF, delivered to LEMF.

Figure 4:
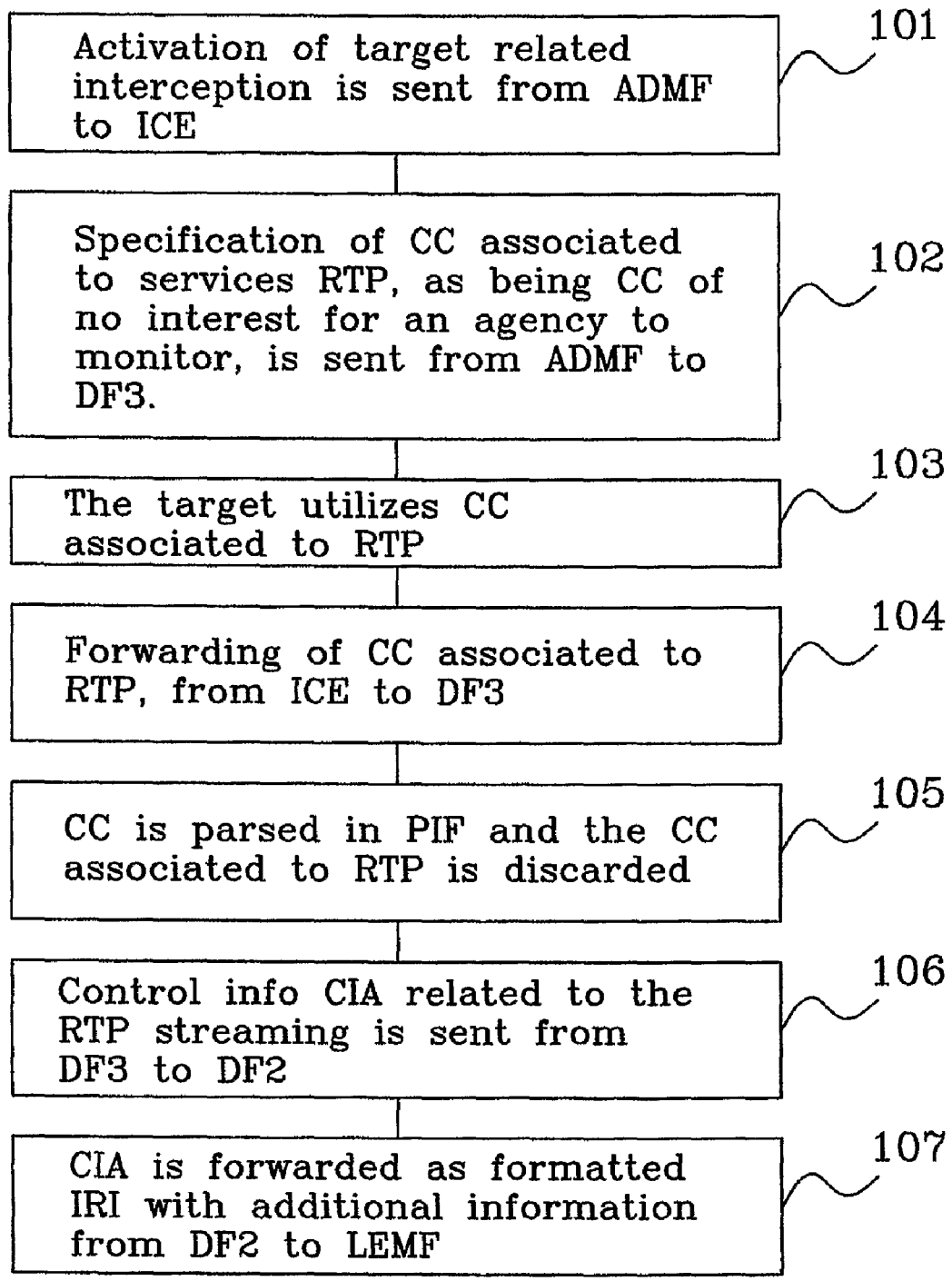
FIG. 4 discloses a flow chart illustration with some essential method steps of the invention.

FIG. 4 discloses a flowchart in which some important steps are shown. The flowchart is to be read together with the earlier shown figures. The flowchart comprises the following steps:

Interception related to a target is activated from an Administration Function ADMF to a service unaware Intercepting Control Element ICE. A block 101 discloses this step in FIG. 4.

A specification of which Content of Communication that is of no interest for the agency to monitor and is to be discarded, i.e. CC associated with RTP streaming, is sent from ADMF to DF3. The specification is stored in DF3. RTP streaming is hereby stored in DF3 as a service associated to CC that is of no interest for the agency to monitor. A block 102 discloses this step in FIG. 4.

The target starts to utilize CC associated with RTP streaming. A block 103 discloses this step in FIG. 4.

CC packets associated with RTP streaming are forwarded from ICE to the Packet Inspection Feature PIF. A block 104 discloses this step in FIG. 4.

The Packet Inspection Feature PIF parses and detects RTP streaming as a service associated to CC that is of no interest for the agency to monitor and instead is to be discarded. A block 105 discloses this step in FIG. 4.

Control Information CIA related to the RTP streaming associated with the discarded CC is sent from the Delivery Function DF3 to the Delivery Function DF2. A notification is hereby sent with information about the services which packets have been discarded and with additional information for each service. A block 106 discloses this step in FIG. 4.

Intercept Related Information IRI is formatted in DF2 as a new record type, namely "Not requested service specific CC interception". The record comprises additional info about the services which packets have been discarded and additional information for the service. The Control Information CIA is forwarded as formatted Intercept Related Information IRI with additional information, from the Delivery Function DF2 to the LEMF via the Handover Interface HI2. A block 107 discloses this step in FIG. 4.

Figure 5:
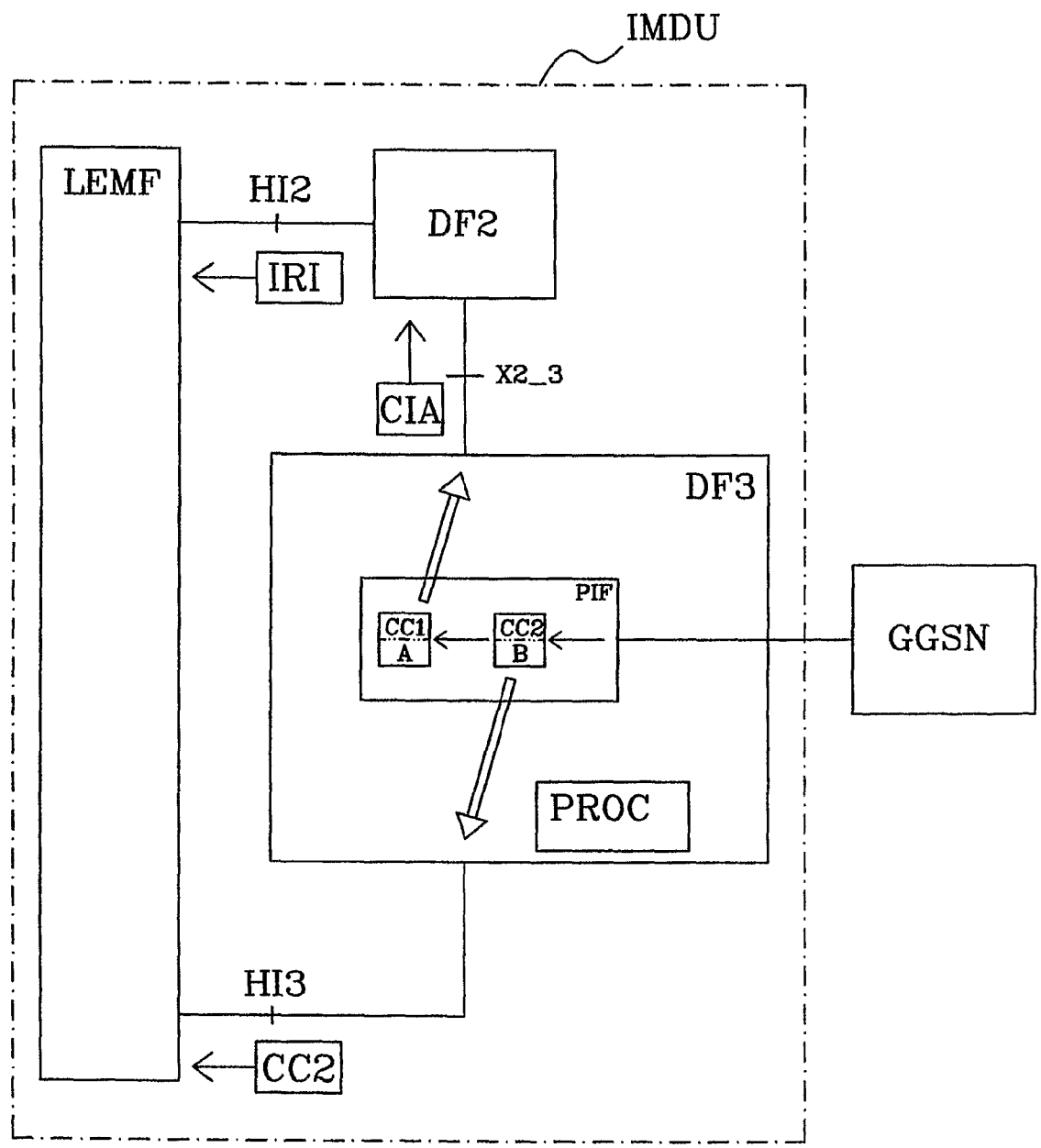
FIG. 5 discloses a block schematic illustration of a system that can be used to put the invention into practice.

A system that can be used to put the invention into practice is schematically shown in FIG. 5. The block schematic constellation corresponds to the one disclosed in FIG. 1. The Intercepting Control Element ICE is in this example a Gateway GPRS Support Node GGSN. The Delivery function DF3 comprises the Packet Inspection Feature PIF. A processor PROC in the Intercept Mediation and Deliver Unit IMDU handles the control of data from the GGSN and also the control of the specifications of which services that are of interest and/or of no interest for the agencies. In FIG. 5 two CC packets CC1 and CC2 have been forwarded to the PIF. CC1 is associated to not desired services A and CC2 is associated to desired services B. The processor controls parsing of packets in the Packet Inspection Feature PIF and handles the sending of CC2 associated to the desired service B, to LEMF, and the sending of CIA associated to the not desired service A via DF2 to LEMF. Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

Below is disclosed an example of HI2 protocol specification: ASN 1 spec in 3GPP TS 33.108

```
-- Parameters having the same tag numbers must be identical in Rel-5 and Rel-6 modules.
IRI-Parameters        ::= SEQUENCE
{
    hi2DomainId            [0] OBJECT IDENTIFIER, -- 3GPP HI2 domain
    iRIversion             [23] ENUMERATED
    {
        version2 (2),
        ...,
        version3 (3),
        version4 (4),
            -- note that version5 (5) cannot be used as it was missed in the version 5 of
this
            -- ASN.1 module.
        version6 (6)
    } OPTIONAL,
        -- if not present, it means version 1 is handled
    lawfulInterceptionIdentifier      [1] LawfulInterceptionIdentifier,
        -- This identifier is associated to the target.
    timeStamp              [3] TimeStamp,
        -- date and time of the event triggering the report.)
    initiator              [4] ENUMERATED
    {
        not-Available       (0),
        originating-Target  (1),
            -- in case of GPRS, this indicates that the PDP context activation,
modification
            -- or deactivation is MS requested
        terminating-Target  (2),
            -- in case of GPRS, this indicates that the PDP context activation,
```

-continued

```
        modification or
                -- deactivation is network initiated
            ...
        } OPTIONAL,
        locationOfTheTarget         [8] Location OPTIONAL,
            -- location of the target subscriber
        partyInformation            [9] SET SIZE (1..10) OF PartyInformation OPTIONAL,
            -- This parameter provides the concerned party, the identiy(ies) of the party
            --)and all the information provided by the party.
        serviceCenterAddress        [13] PartyInformation OPTIONAL,
            -- e.g. in case of SMS message this parameter provides the address of the
relevant
            -- server within the calling (if server is originating) or called (if server is
            -- terminating) party address parameters
        sMS                         [14] SMS-report OPTIONAL,
            -- this parameter provides the SMS content and associated information
        national-Parameters         [16] National-Parameters OPTIONAL,
        gPRSCorrelationNumber       [18] GPRSCorrelationNumber OPTIONAL,
        gPRSevent                   [20] GPRSEvent OPTIONAL,
            -- This information is used to provide particular action of the target
            -- such as attach/detach
        sgsnAddress                 [21] DataNodeAddress OPTIONAL,
        gPRSOperationErrorCode      [22] GPRSOperationErrorCode OPTIONAL,
        ggsnAddress                 [24] DataNodeAddress OPTIONAL,
        qOS                         [25] UmtsQos OPTIONAL,
        networkIdentifier           [26] Network-Identifier OPTIONAL,
        sMSOriginatingAddress       [27] DataNodeAddress OPTIONAL,
        sMSTerminatingAddress       [28] DataNodeAddress OPTIONAL,
        iMSevent                    [29] IMSevent OPTIONAL,
        sIPMessage                  [30] OCTET STRING OPTIONAL,
        servingSGSN-number          [31] OCTET STRING (SIZE (1..20))    OPTIONAL,
        servingSGSN-address         [32] OCTET STRING (SIZE (5..17))    OPTIONAL,
                                        -- Octets are coded according to 3GPP TS 23.003 [25]
        ...,
        notRequestedServiceCC       [34] ServiceCCList OPTIONAL,
        notRequestedServiceCCInfo [35] OCTET STRING OPTIONAL,
        -- See Ref.4 for the specification of these information parameter
        national-HI2-ASN1parameters [255]   National-HI2-ASN1parameters OPTIONAL
}
-- Parameters having the same tag numbers must be identical in Rel-5 and Rel-6 modules
-- PARAMETERS FORMATS
ServiceCCList::= ENUMERATED
{
    http,
    rtp,
    ftp,
    wtp,
    mms,
    smtp,
    pop3,
    msn,
    sip,
    sdp,
    ucp,
    icmp,
    ...
}
```

The invention is not limited to the above described and in the drawings shown embodiments but can be modified within the scope of the enclosed claims. Instead of using the Packet Inspection Feature PIF located within DF3, features in an external node like the Service Aware Support node SASN mentioned in the background part can be integrated in the Intercept Mediation and Deliver Unit. The systems and methods of the present invention may be implemented on any of the Third Generation Partnership Project (3GPP), European Telecommunications Standards Institute (ETSI), American National Standards Institute (ANSI) or other standard telecommunication network architecture, consistent with the Communications Assistance for Law Enforcement Act (CALEA), which is a United States law requiring telephone network architectures be designed to enable authorized electronic interception.

The invention claimed is:

1. A method in a telecommunication system for intercepting and reporting to a requesting entity, information related to communications to and from a target, the method comprising the steps of activating a target-related interception in a service-unaware telecommunication node in response to a request from the requesting entity to receive target-related communication information for specified services;

receiving by a first Delivery Function from the service-unaware telecommunication node. Content of Communication for both the specified services and for unspecified services associated with the target;

receiving by a second Delivery Function from the service-unaware telecommunication node, Intercept Related Information associated with the target;

analyzing by a Packet Inspection Feature associated with the first Delivery-Function, the Content of Communication received from the service-unaware telecommunication node to identify unspecified Content of Communication related to the unspecified services, wherein the unspecified Content of Communication is delimited from the Content of Communication received from the service-unaware telecommunication node;

sending from the first Delivery Function to the second Delivery Function, Control Information related to the unspecified Content of Communication delimited from the Content of Communication received from the service-unaware telecommunication node;

forwarding from the first Delivery Function to the requesting entity, only, the Content of Communication for the specified services; and forwarding from the second Delivery Function to the requesting entity, the Control Information related to the unspecified Content of Communication delimited from the Content of Communication received from the service-unaware telecommunication node.

2. The method according to claim 1, wherein the first Delivery Function and the second Delivery Function are located within an Intercept Mediation and Deliver Unit and whereby the Control information related to the delimited unspecified Content of Communication is forwarded between the first and second Delivery Functions via an internal interface.

3. The method according to claim 1, wherein the Packet Inspection Feature is located within the first Delivery Function.

4. An apparatus in communication with a service-unaware telecommunication node in a telecommunication system, the apparatus for intercepting and reporting to a requesting entity, information related to communications to and from a target, wherein the apparatus includes a processor coupled to a non-transitory memory that stores computer program instructions, wherein when the processor executes the computer program instructions, the apparatus is caused to:

activate a target-related interception in the service-unaware telecommunication node in response to a request from the requesting entity to receive target-related communication information for specified services;

receive in a first Delivery Function of the apparatus from the service-unaware telecommunication node, Content of Communication for both the specified services and for unspecified services associated with the target;

receive in a second Delivery Function from the service-unaware telecommunication node, Intercept Related Information associated with the target;

analyze by a Packet Inspection Feature associated with the first Delivery-Function, the Content of Communication received from the service-unaware telecommunication node to identify unspecified Content of Communication related to the unspecified services, wherein the unspecified Content of Communication is delimited from the Content of Communication received from the service-unaware telecommunication node;

send from the first Delivery Function to the second Delivery Function, Control Information related to the unspecified Content of Communication delimited from the Content of Communication received from the service-unaware telecommunication node;

forward from the first Delivery Function to the requesting entity, only the Content of Communication for the specified services; and forward from the second Delivery Function to the requesting entity, the Control Information related to the unspecified Content of Communication delimited from the Content of Communication received from the service-unaware telecommunication node.

5. The apparatus according to claim 4 further comprising an internal interface between the first Delivery Function and the second Delivery Function configured to send the Control Information related to the delimited unspecified Content of Communication.

6. The apparatus according to claim 4, wherein the Packet inspection Feature is located within the first Delivery Function.

* * * * *

UNITED STATES PATENT AND TRADEMARK OFFICE
CERTIFICATE OF CORRECTION

PATENT NO. : 8,400,927 B2  
APPLICATION NO. : 12/375116  
DATED : March 19, 2013  
INVENTOR(S) : Attanasio et al.

Page 1 of 1

It is certified that error appears in the above-identified patent and that said Letters Patent is hereby corrected as shown below:

In the Specifications

In Column 2, Line 3, delete "monitored," and insert -- monitored. --, therefor.

In Column 2, Line 24, delete "with" and insert -- width --, therefor.

In Column 8, Line 35, delete "both)," and insert -- both)), --, therefor.

In Column 9, Line 8, delete "identiy(ies)" and insert -- identity(ies) --, therefor.

In the Claims

In Column 10, Line 55, in Claim 1, delete "steps of" and insert -- steps of: --, therefor.

In Column 10, Line 60, in Claim 1, delete "node." and insert -- node, --, therefor.

In Column 11, Line 13, in Claim 1, delete "only," and insert -- only --, therefor.

Signed and Sealed this  
Eleventh Day of June, 2013

Teresa Stanek Rea  
*Acting Director of the United States Patent and Trademark Office*